Nov. 17, 1970  R. W. MABRY ET AL  3,540,196

COTTON SPINDLE

Filed Sept. 19, 1968

INVENTORS
RAY W. MABRY
ARTHUR DAVID GRIMES

BY Mason, Mason & Allbright
Attorneys

United States Patent Office 3,540,196
Patented Nov. 17, 1970

3,540,196
COTTON SPINDLE
Ray W. Mabry, Box 295, Tutwiler, Miss. 38963, and Arthur David Grimes, P.O. Box 5193, Tupelo, Miss. 38801
Filed Sept. 19, 1968, Ser. No. 760,766
Int. Cl. A01d 45/18
U.S. Cl. 56—50                                    7 Claims

ABSTRACT OF THE DISCLOSURE

A cotton spindle rod has at least one row of teeth extending longitudinally at one end of the rod. The row of teeth is bordered on at least one side by a longitudinal notch which coextends with the row. The teeth each have a front face, a rounded part and a flat surface. The sides of the rows of teeth form part of the walls of the notches.

---

This invention relates to new and useful cotton picking spindles of the type which are rotated while being moved in a circular or oval path. These spindles are moved through rows of cotton plants in a bar or slat member to pick cotton and thereafter deposit the cotton on a stripper mounted in the path of the slat member. Recently, spindles have been developed which can be rotated in either direction, clockwise or counterclockwise, and this invention is concerned with such spindles.

It is an object of the present invention to provide a new and useful cotton picking spindle which can be mounted to rotate in either direction.

It is another object of the present invention to provide an effective cotton picking spindle which can be inexpensively manufactured.

Figure 1:
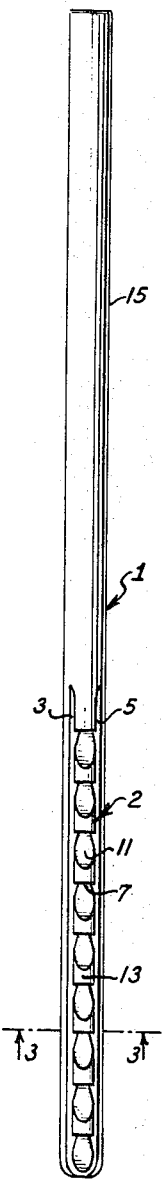
Figure 2:
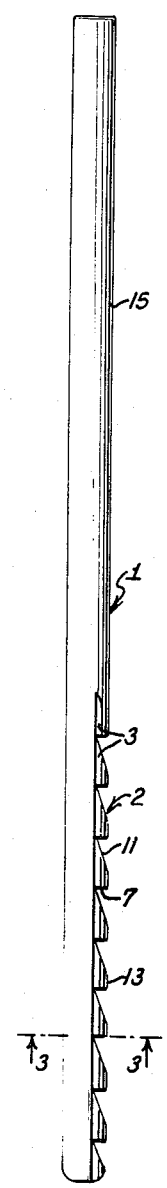
Figure 4:
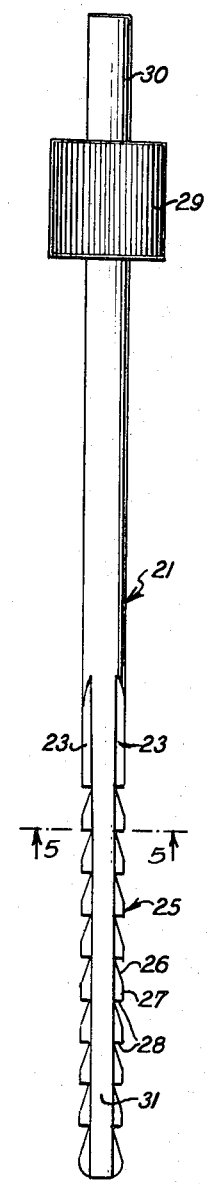
Figure 3:
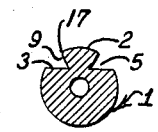
Figure 5:
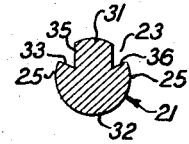

The above and other objects will be apparent from the following description and drawings in which:

FIG. 1 is a top plan view of the spindle;
FIG. 2 is a plan view of the spindle of FIG. 1 turned 90°;
FIG. 3 is a section of the spindle of FIG. 2 taken along line 3—3;
FIG. 4 is a plan view of a modified spindle having two rows of teeth; and,
FIG. 5 is a section view taken along the line 5—5 of FIG. 4.

In FIG. 1, a spindle 1 formed from a cylindrical rod has a row of teeth 2 on its picking portion at one end and a shank 15 at the opposite end. Each of the teeth 2 has a flat surface 11 which is inclined to the horizontal when viewed from the side (FIG. 2). The rearmost end of the flat surface 11 adjoins the front face 7 of the preceding tooth. At its forward end, the surface terminates with a rounded tooth part 13. The tooth part 13 forms part of the cylindrical arcuate surface of the spindle 1. The ridge of tooth part 13 is generally horizontal when viewed from the side and ends with the tooth front face 7. The face 7 is substantially vertical so that it forms a flat face which is at right angles to the horizontal axis of the spindle 1.

As seen in FIGS. 1 and 3, two longitudinal grooves or notches 3 and 5 border the row of teeth and coextend with the row, generally parallel to the longitudinal axis of the spindle 1. The notches 3 and 5 present substantially flat surfaces but are beveled to undercut each of the teeth 2 so that the lower parts of the teeth are narrower than their upper parts when viewed in section. Thus an edge 17 is produced between the flat surface 11 and the tooth part 13 with the notch walls to snag cotton fibers when rotated in contact with the fibers.

The teeth and notch combination readily releases the cotton when put through a stripper.

Each of the teeth 2 have sides 9 which form generally right angles to their front faces 7 and these sides 9 form part of a wall of the notches 3 and 5.

It is preferred that the rounded tooth part 13 subtend an angle of less than 90° when viewed in section (FIG. 3), preferably about 60°, and that the notches 3 and 5 be located slightly above the longitudinal axis of the spindle 1 on opposite sides of the spindle.

In FIGS. 4 and 5 a modified spindle 21 shown with a shank 30, a roller 29 and two rows of teeth 25. The teeth are identical to the teeth of the single row in the spindle shown in FIGS. 1–3 but only one side of each row, 33 and 36, forms part of the wall of its respective longitudinal notch 23. The teeth 25 of each row have a flat surface 26, a rounded tooth part 27 and a tooth front face 28, which intersects its respective notch 23 and its single side 33 or 36 at substantially right angles. Thus the side 33 or 36 of each row of teeth afford a picking portion of the spindle depending on which direction the spindle is rotated. Also, the segment 31 of the rod between the rods of teeth 25 is rounded and, in fact, forms part of the cylindrical surface of the rod spindle 21 as do the parts 27 of the teeth.

When viewed in section (FIG. 5), spindle 21 resembles the spindle of FIGS. 1–3 but the rounded segment 31 is seen in the same position as the single row of teeth 2 in FIG. 3 and the sides 33 and 36 are beveled inwardly so that these sides form part of a wall of their respective notches. The segment 31 has sides 35 which are substantially perpendicular to the horizontal plane passing through the longitudinal axis of the spindle 21.

The spindle of FIGS. 4 and 5 is unique in that its two rows of teeth can pick in the same direction—rotated either way—whereas the existing double barb spindles only pick with one row of teeth.

Although I have described the preferred embodiments of my invention, it is to be understood that it is capable of other adaptations and modifications within the scope of the appended claims.

What is claimed is:

1. A cotton picking spindle comprising an elongated cylindrical rod with a shank at one end and a picking portion at the opposite end, at least one row of picking teeth on said picking portion and at least one longitudinal notch located adjacent said row, each of said teeth having a tooth front face which intersects said notch at substantially right angles, each of said teeth having a flat surface and a rounded tooth part, said rounded tooth part forming part of the cylindrical arcuate surface of said rod, the forward part of said flat surface terminating in said tooth part and the rear part of said flat surface being contiguous with the tooth front face of a preceding tooth, the side of said row adjacent said notch forming part of one wall of said longitudinal notch which coextends with said row of teeth.

2. The spindle of claim 1 wherein the side of the row of teeth forming a part of a wall of said notch is beveled inwardly whereby the lower portion of each tooth is narrower than the upper portion of said tooth when viewed in section.

3. The spindle of claim 1 wherein the rounded tooth cap subtends an angle less than 90°.

4. The spindle of claim 1 wherein the tooth front face is positioned forwardly with respect to the tooth picking portion of said spindle.

5. The spindle of claim 1 wherein a longitudinal notch is located adjacent each side of said row and the respective sides of said teeth form part of the corresponding wall of said notches which coextend with said row of teeth.

6. The spindle of claim 1 wherein there are two rows of teeth, each of said rows having a single longitudinal notch coextending with its respective row of teeth, one side of each of said rows of teeth in a row forming part of one wall of its respective notch, the remaining side of each of said rows of teeth forming part of the cylindrical arcuate surface of said rod and being contiguous with the rounded tooth caps of its respective teeth.

7. The spindle of claim 6, wherein the sides of said rows of teeth which form part of a wall of their respective notches are adjacent to one another to form right and left-handed picking teeth whereby said spindle can be rotated in each direction to pick cotton.

References Cited

UNITED STATES PATENTS

| | | | |
|---|---|---|---|
| 685,439 | 10/1901 | Campbell | 56—50 |
| 762,606 | 6/1904 | Appleby | 56—50 |
| 908,638 | 1/1909 | Appleby | 56—50 |
| 1,008,230 | 11/1911 | White | 56—50 |
| 2,935,835 | 5/1960 | Wood | 56—50 |
| 2,943,431 | 7/1960 | Gray et al. | 56—50 |
| 3,220,169 | 11/1965 | Keith | 56—50 |
| 3,225,528 | 12/1965 | Gray | 56—50 |

RUSSELL R. KINSEY, Primary Examiner